US010855159B1

(12) United States Patent
Gewarges et al.

(10) Patent No.: US 10,855,159 B1
(45) Date of Patent: Dec. 1, 2020

(54) COIL REGENERATION DEVICE AND METHOD OF USE

(71) Applicants: John Sabah Gewarges, El Cajon, CA (US); Shashank Reddy Goli, Freemont, CA (US)

(72) Inventors: John Sabah Gewarges, El Cajon, CA (US); Shashank Reddy Goli, Freemont, CA (US)

( * ) Notice: Subject to any disclaimer, the term of this patent is extended or adjusted under 35 U.S.C. 154(b) by 0 days.

(21) Appl. No.: 16/803,190

(22) Filed: Feb. 27, 2020

(51) Int. Cl.
| | |
|---|---|
| *H02K 35/02* | (2006.01) |
| *F03B 13/14* | (2006.01) |
| *F03B 13/26* | (2006.01) |
| *H02K 7/18* | (2006.01) |
| *H02K 11/00* | (2016.01) |
| *H02K 11/04* | (2016.01) |

(52) U.S. Cl.
CPC ............ *H02K 35/02* (2013.01); *F03B 13/14* (2013.01); *F03B 13/268* (2013.01); *H02K 7/1876* (2013.01); *H02K 11/0094* (2013.01); *H02K 11/046* (2013.01)

(58) Field of Classification Search
CPC .. H02K 35/02; H02K 7/1876; H02K 11/0094; H02K 11/046; F03B 13/14; F03B 13/268
See application file for complete search history.

(56) References Cited

U.S. PATENT DOCUMENTS

| | | | | |
|---|---|---|---|---|
| 3,696,251 A * | 10/1972 | Last | .................... | F03B 13/1855 290/53 |
| 5,347,186 A * | 9/1994 | Konotchick | ......... | H02K 7/1876 310/17 |
| 6,952,060 B2 | 10/2005 | Goldner et al. | | |
| 7,084,548 B1 * | 8/2006 | Gabrys | ................ | H02K 1/2793 310/156.08 |
| 7,148,583 B1 * | 12/2006 | Shau | .................... | H02K 7/1876 290/1 R |
| 7,250,697 B2 | 7/2007 | Beaulieu | | |
| 7,530,975 B2 * | 5/2009 | Hunter | ................. | A61B 5/0051 604/500 |
| 7,615,900 B1 * | 11/2009 | Harris | .................... | H02K 35/02 310/166 |
| 7,868,475 B1 | 1/2011 | Bradford et al. | | |
| 8,160,774 B2 * | 4/2012 | Li | ........................ | B60G 13/001 701/37 |

(Continued)

*Primary Examiner* — Tulsidas C Patel
*Assistant Examiner* — Joseph Ortega
(74) *Attorney, Agent, or Firm* — Procopio Cory Hargreaves and Savitch LLP

(57) ABSTRACT

A coil regeneration device comprises an electrically conductive coil including a coiled section; a double magnet system including an inner magnet disposed inside and movable within the coiled section and an outer magnet surrounding and movable with respect to the coiled section with matched directional polarity with the inner magnet, wherein the double magnet system is configured to be coupled to a dynamic foreign entity that applies a specific frequency of oscillating motion that translates into corresponding oscillating motion of the outer magnet, which imparts corresponding oscillating motion to the inner magnet, the oscillating motion of the double magnet system relative to the coiled section producing a magnetic field that induces an electrical field in the electrically conductive coil.

16 Claims, 6 Drawing Sheets

(56) References Cited

U.S. PATENT DOCUMENTS

| | | | |
|---|---|---|---|
| 8,217,523 B2* | 7/2012 | Brown | H02K 7/1853 |
| | | | 290/1 R |
| 8,513,824 B2 | 8/2013 | Sohn | |
| 8,614,518 B2* | 12/2013 | Li | F16F 9/3292 |
| | | | 290/1 R |
| 8,704,387 B2* | 4/2014 | Lemieux | F03G 7/08 |
| | | | 290/1 R |
| 8,907,505 B2* | 12/2014 | Fortier | F03G 5/06 |
| | | | 290/1 R |
| 9,790,755 B2* | 10/2017 | Bourque | E21B 27/02 |
| 10,072,724 B2* | 9/2018 | Haugen | B60G 13/14 |
| 10,364,860 B2* | 7/2019 | Griffin | F16F 6/005 |
| 10,498,208 B1 | 12/2019 | Kebabian | H02K 5/02 |
| 10,715,021 B2* | 7/2020 | Ito | H02K 33/16 |
| 2003/0034697 A1 | 2/2003 | Goldner | |
| 2003/0155828 A1* | 8/2003 | Cheung | H02K 35/02 |
| | | | 310/90.5 |
| 2006/0125325 A1 | 6/2006 | Beaulieu | |
| 2006/0237968 A1* | 10/2006 | Chandrasekaran | H02M 7/2176 |
| | | | 290/1 R |
| 2009/0051229 A1* | 2/2009 | Shau | H02K 35/02 |
| | | | 310/15 |
| 2009/0085359 A1* | 4/2009 | Mabuchi | H02K 35/02 |
| | | | 290/1 R |
| 2010/0033030 A1* | 2/2010 | Amemiya | H02K 33/00 |
| | | | 310/12.16 |
| 2010/0270871 A1 | 10/2010 | Chou | |
| 2011/0227425 A1 | 9/2011 | Sohn | |
| 2012/0061893 A1* | 3/2012 | Hochberg | F16F 6/00 |
| | | | 267/195 |
| 2012/0104877 A1* | 5/2012 | Isaacs | H02K 35/02 |
| | | | 310/30 |
| 2012/0133151 A1* | 5/2012 | Bottarel | H02M 7/217 |
| | | | 290/1 A |
| 2012/0242173 A1* | 9/2012 | Hu | H02K 35/02 |
| | | | 310/12.18 |
| 2014/0152125 A1* | 6/2014 | Gray | H02K 7/1876 |
| | | | 310/24 |
| 2014/0288776 A1* | 9/2014 | Anderson | B60G 17/0157 |
| | | | 701/37 |
| 2015/0330372 A1* | 11/2015 | Nulman | H02K 35/02 |
| | | | 290/1 R |
| 2016/0258254 A1* | 9/2016 | Guo | E21B 47/06 |
| 2017/0126110 A1* | 5/2017 | Shahosseini | H02P 25/06 |
| 2017/0194837 A1* | 7/2017 | Sichau | F03D 9/007 |
| 2019/0085815 A1* | 3/2019 | Barton | H02K 35/02 |
| 2019/0087063 A1* | 3/2019 | Gomi | H02K 7/1876 |
| 2019/0226444 A1* | 7/2019 | McCall | H02K 35/02 |
| 2020/0063707 A1* | 2/2020 | McCall | F03B 13/1845 |
| 2020/0198482 A1* | 6/2020 | McAnallan | B60L 50/90 |

* cited by examiner

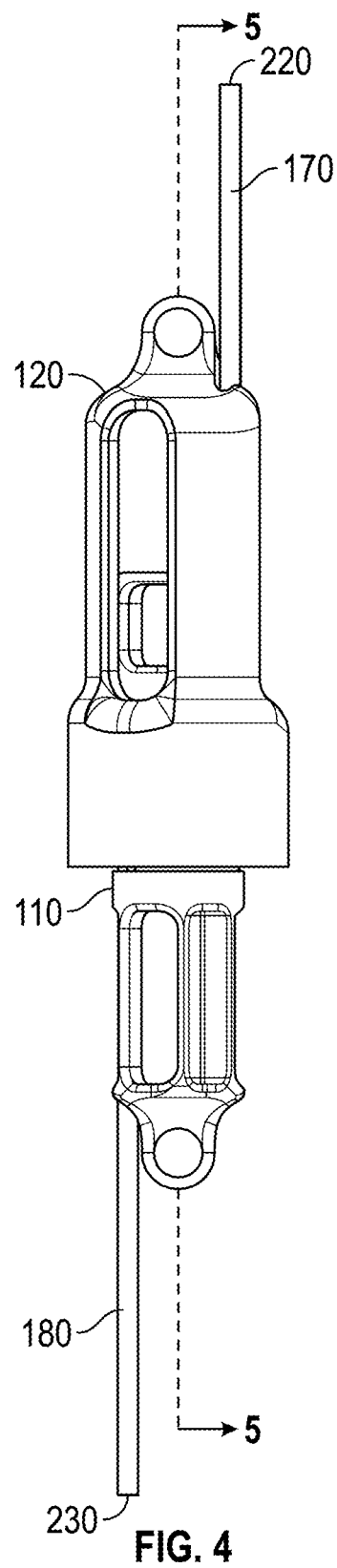
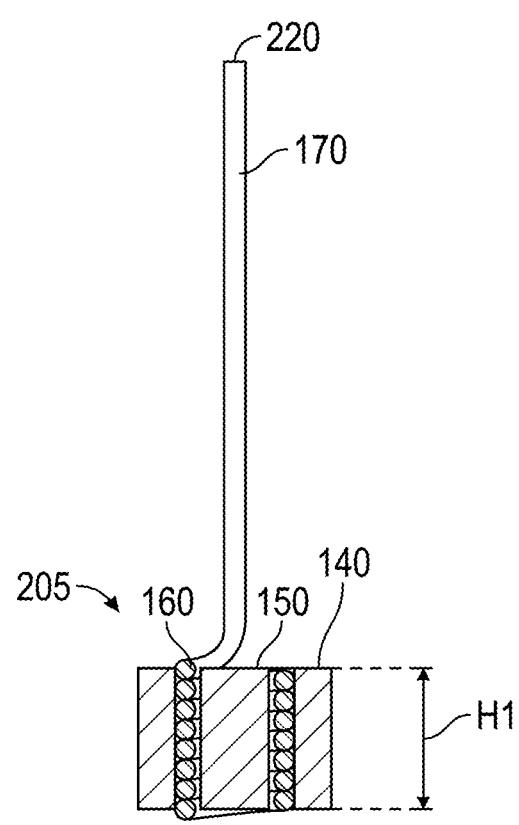
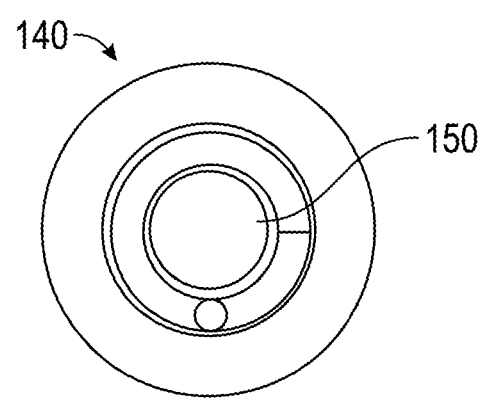
FIG. 4
FIG. 5
FIG. 6

COIL REGENERATION DEVICE AND METHOD OF USE

FIELD OF THE INVENTION

The present invention relates to electromechanical devices that convert kinetic energy into electrical energy.

SUMMARY OF THE INVENTION

An aspect of the invention involves a coil regeneration device comprising an electrically conductive coil including a coiled section; a double magnet system including an inner magnet disposed inside and movable within the coiled section and an outer magnet surrounding and movable with respect to the coiled section with matched directional polarity with the inner magnet, wherein the double magnet system is configured to be coupled to a dynamic foreign entity that applies a specific frequency of oscillating motion that translates into corresponding oscillating motion of the outer magnet, which imparts corresponding oscillating motion to the inner magnet, the oscillating motion of the double magnet system relative to the coiled section producing a magnetic field that induces an electrical field in the electrically conductive coil.

One or more implementations of the aspect of the invention described immediately above includes one or more of the following: oscillating motion of the outer magnet imparts lagging and corresponding oscillating motion to the inner magnet; the electrically conductive coil includes conductive wire members extending in opposition directions from the coiled section; an outer casing enclosing the outer magnet and a coil casing enclosing the electrically conductive coil; the outer casing and the coil casing include ends configured to be mounted to the dynamic foreign entity; the inner magnet is cylindrical and the outer magnet is ring-shaped; an electrical circuit electrically coupled to the electrically conductive coil to produce electricity; the electrical circuit includes a transformer that transforms low voltage-high current to high voltage-low current; the electrical circuit includes a rectifier that takes alternating current-voltage and produces direct current-voltage; the electrical circuit includes a capacitor that makes the voltage steady; and/or the coil regeneration device is used with one or more of water dams, lake reserves, cliff-side ocean generators, exercise machines, electric vehicles, and electric hybrid vehicles.

Another aspect of the invention involves a method of using the coil regeneration device of the aspect of the invention described above. The method comprises receiving from the dynamic foreign entity oscillating motion, which translates into corresponding oscillating motion of the outer magnet; imparting corresponding oscillating motion to the inner magnet from the corresponding oscillating motion of the outer magnet; producing a magnetic field that induces an electrical field in the electrically conductive coil caused by the oscillating motion of the double magnet system relative to the coiled section.

One or more implementations of the method aspect of the invention described immediately above includes one or more of the following: oscillating motion of the outer magnet imparts lagging and corresponding oscillating motion to the inner magnet; an electrical circuit electrically coupled to the electrically conductive coil to produce electric energy, and the method further comprising producing electric energy with the coil regeneration device; the coil regeneration device is used with a water dam and the dynamic foreign entity oscillating motion is the raising and lowering of water level in the water dam; the coil regeneration device is used with a lake reserve and the dynamic foreign entity oscillating motion is the raising and lowering of water level in the lake reserve; the coil regeneration device is used with a cliff-side ocean generator and the dynamic foreign entity oscillating motion is from water waves; the coil regeneration device is used with at least one of an electric vehicle and an electric hybrid vehicle, and the dynamic foreign entity oscillating motion is kinetic energy incurred by a vehicle's physics due to gravity; and/or storing the electric energy in at least one of one or more vehicle batteries and one or more supercapacitors.

BRIEF DESCRIPTION OF DRAWINGS

The accompanying drawings, which are incorporated in and form a part of this specification illustrate embodiments of the invention and together with the description, serve to explain the principles of the invention.

FIG. 4 is a side elevational view of the coil regeneration device of FIG. 1.

FIG. 5 is a cross-sectional view, taken along lines 5-5, of the inner magnet, outer magnet, and copper coil of the coil regeneration device of FIG. 1.

FIG. 6 is a top plan view of the inner magnet, outer magnet, and copper coil of the coil regeneration device of FIG. 1.

DESCRIPTION OF EMBODIMENT OF THE INVENTION

Figure 1:
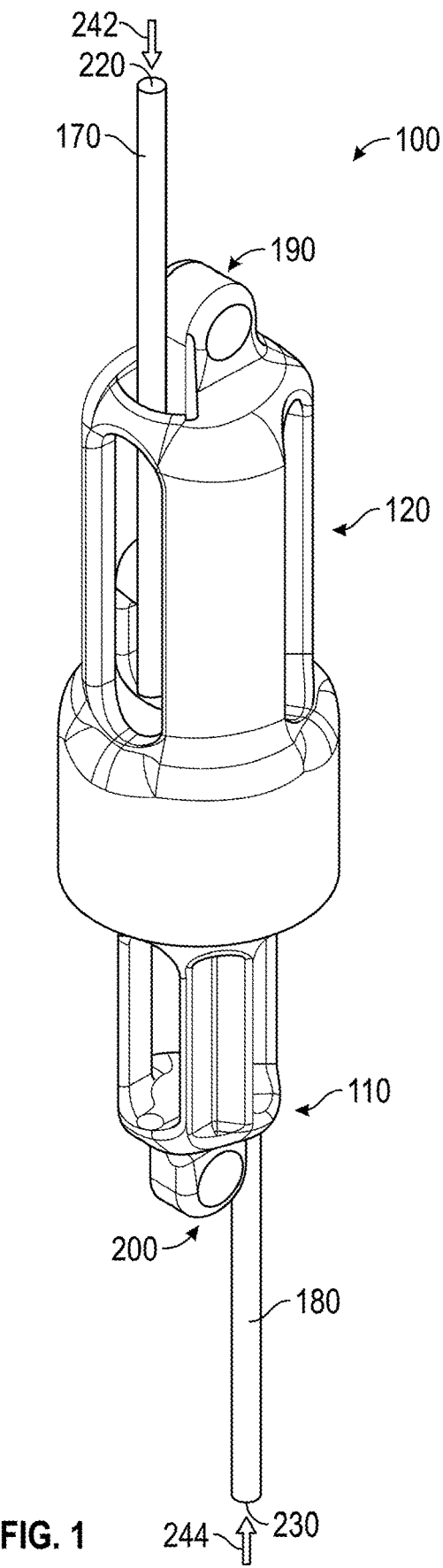
FIG. 1 is a perspective view of an embodiment of a coil regeneration device.
Figure 2:
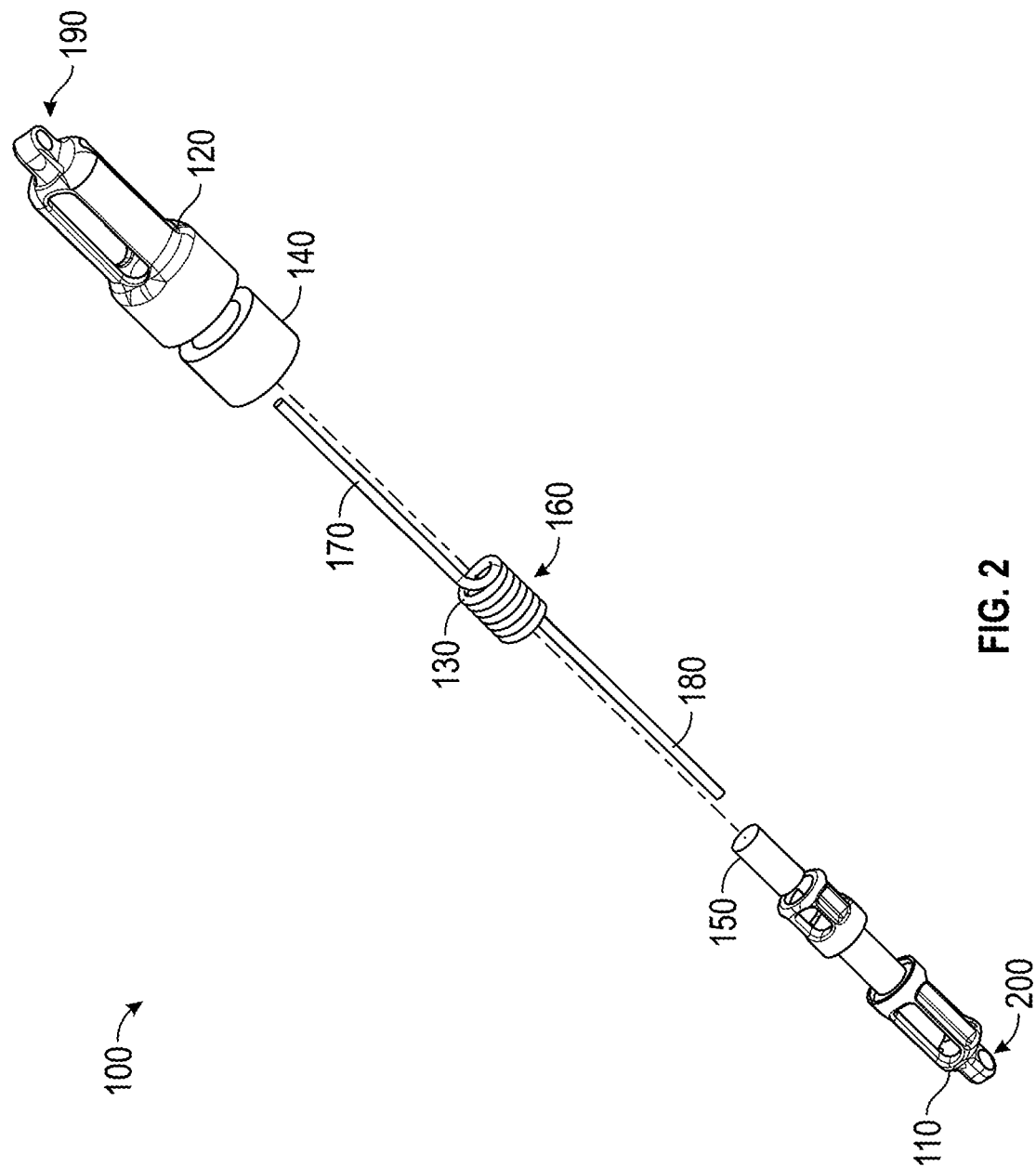
FIG. 2 is an exploded perspective view of the coil regeneration device of FIG. 1.
Figure 3:
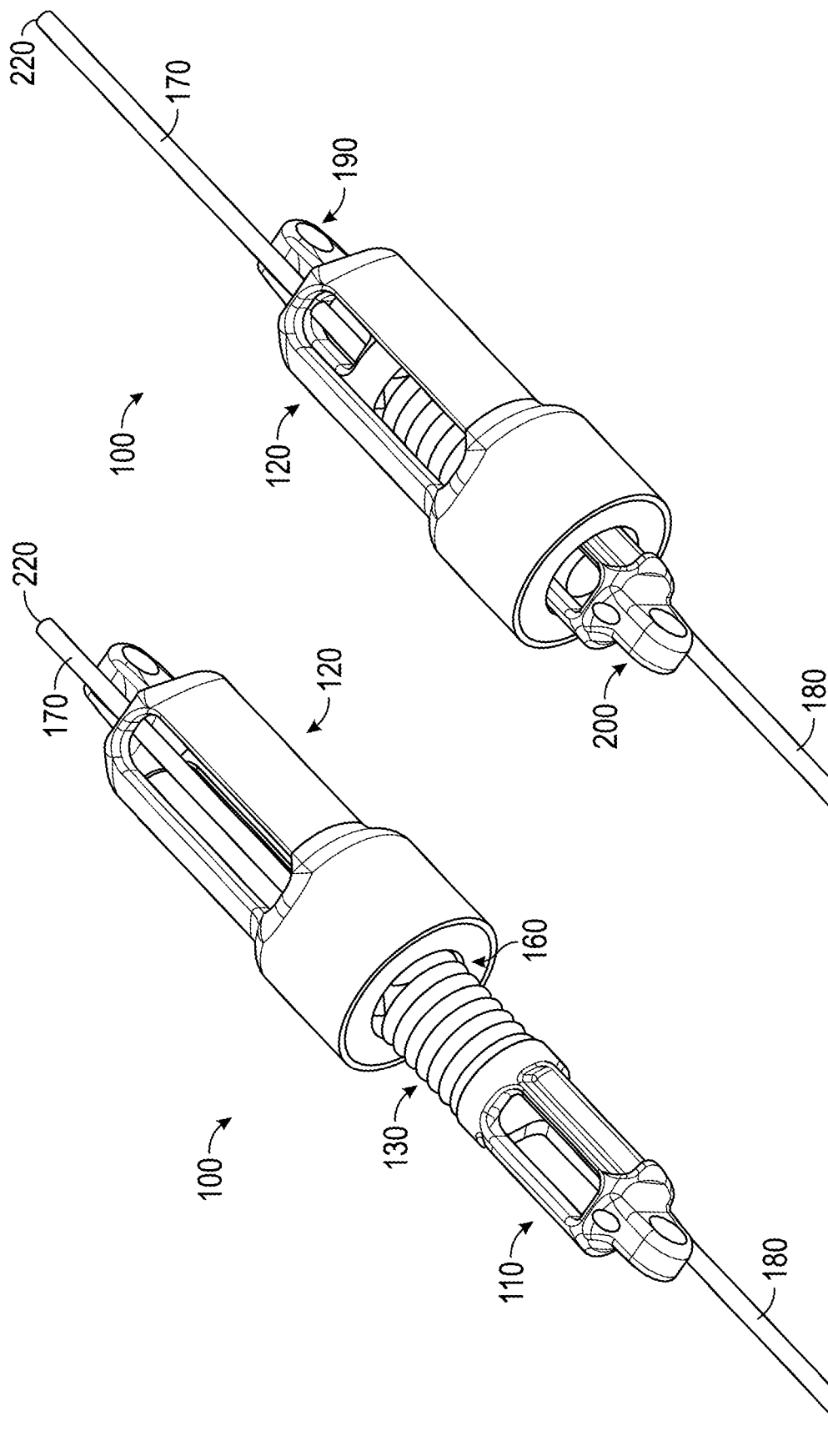
FIG. 3A is a perspective view of the coil regeneration device of FIG. 1 shown in a fully extended dynamic view.
FIG. 3B is a perspective view of the coil regeneration device of FIG. 1 shown in a fully contracted dynamic view.
Figure 7:
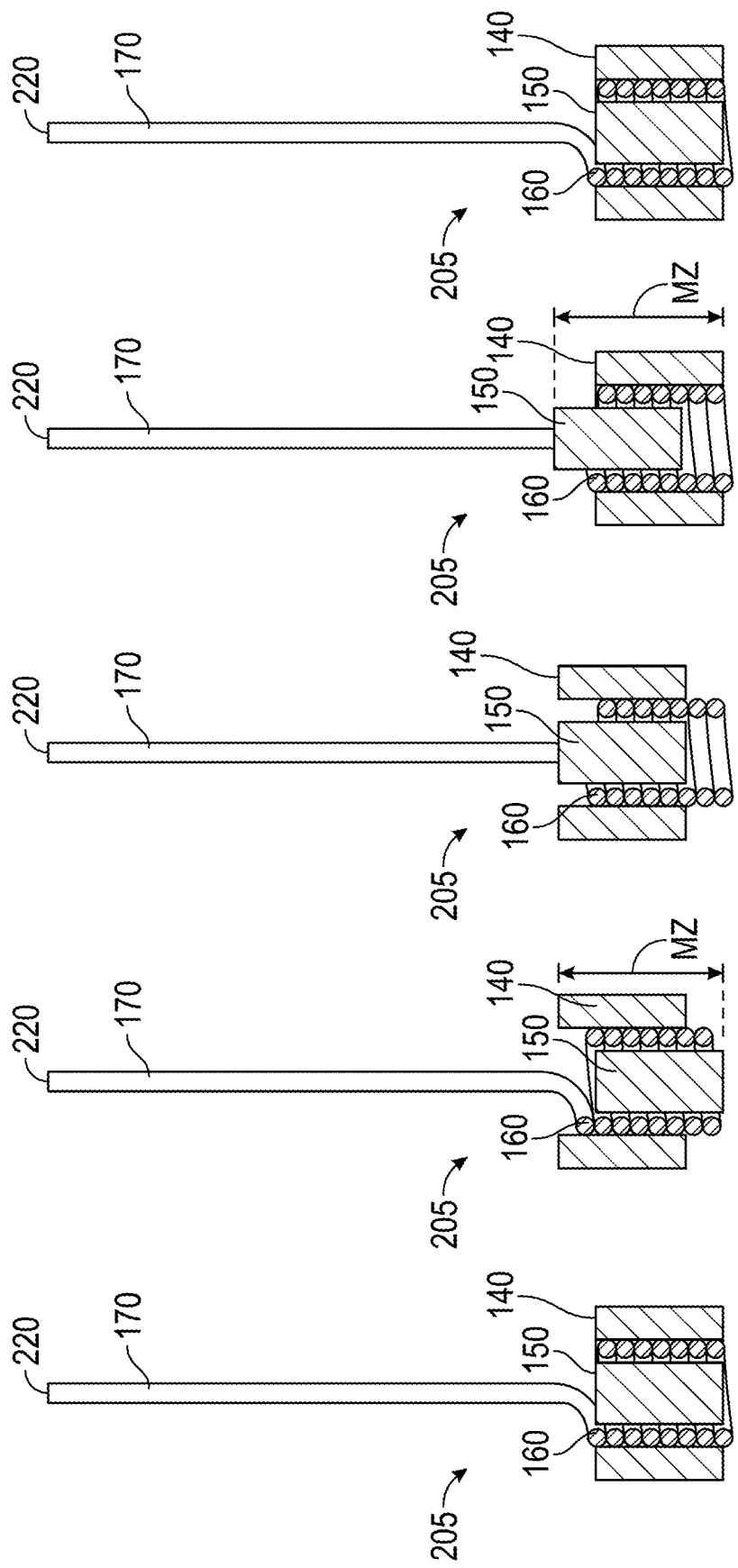
FIGS. 7A-7E are dynamic cross-sectional views, similar to FIG. 5, showing how movement of the inner magnet lags movement of the outer magnet, creating a longer magnetic zone passing along the copper coil.

With reference to FIGS. 1-8, an embodiment of a coil regeneration device or magnetic coil assembly 100 that utilizes Faraday's Law by capturing kinetic energy from a dynamic foreign entity and converting it to electrical energy will be described.

The coil regeneration device 100 includes a copper coil casing 110, an outer magnet casing 120, an electrically conductive copper coil 130, a neodymium ring-shaped outer magnet 140, and a neodymium solid cylindrical inner magnet 150. The copper coil 130 includes coiled section 160 and copper wire members 170, 180 extending in opposition directions from the coiled section 160. The copper coil casing 110 and outer magnet casing 120 include ends 190, 200 that are mounted to a dynamic foreign entity that applies a specific frequency of oscillating motion. The outer magnet 140 is enclosed by the outer magnet casing 120 and the copper coil 130 is enclosed by the copper coil casing 110.

As shown in FIGS. 5-7E, the outer magnet 140 and the inner magnet 150 of coil regeneration device 100 form a double magnet system 205 that works in matching directional polarity to interact with the copper coil 130. The inner magnet 150 moves within the copper coil 130 and the outer magnet 140 moves outside the copper coil 130. The dynamic motion forces the ring-shaped outer magnet 140 and the parallel cylindrical inner magnet 150 to complete a full pass of oscillation as they pass the coiled section 160. This design produces a higher magnetic field compared to single magnet designs of the past using Faraday's Law. The voltage that is induced is then manipulated electrically by an electrical circuit 210 (FIG. 8) to produce a controlled ratio of voltage-current for storage and consumption. This energy can be multiplied by adding the coil regeneration devices 100 in series.

With reference to FIGS. 7A-7D, the movement of the inner magnet 150 lags movement of the outer magnet 140, creating a longer magnetic zone passing along the coiled section 160. The lagging effect creates a change of shape in the total magnetic field forcing an occurrence of changing magnetic flux along its length where the distance of lag starts and ends. The advantage of the lag effect's interaction with the coiled section 130 causes multiple voltage potentials along the changes of shape of the magnetic field as it passes the coiled section 130.

Because the application of the coil regeneration device(s) 100 influences the specific frequency for which it sends to the coil regeneration device(s) 100, all the components of the coil regeneration device(s) 100 are scaled appropriately. The copper coil 130 may differ in coil diameter, wire thickness, number of turns and total length. The heights of both magnets 140, 150 match the height of the coiled section 160. The outer diameter of the inner magnet 150 matches the inner diameter of the coiled section 160, with the exception of a very tight tolerance of space. The inner diameter of the outer magnet 140 matches the outer diameter of the coiled section 160, with the exception of a very tight tolerance of space. The casings 110, 120 are scaled to house the copper coil 130 and outer magnet 140, respectively.

Figure 8:
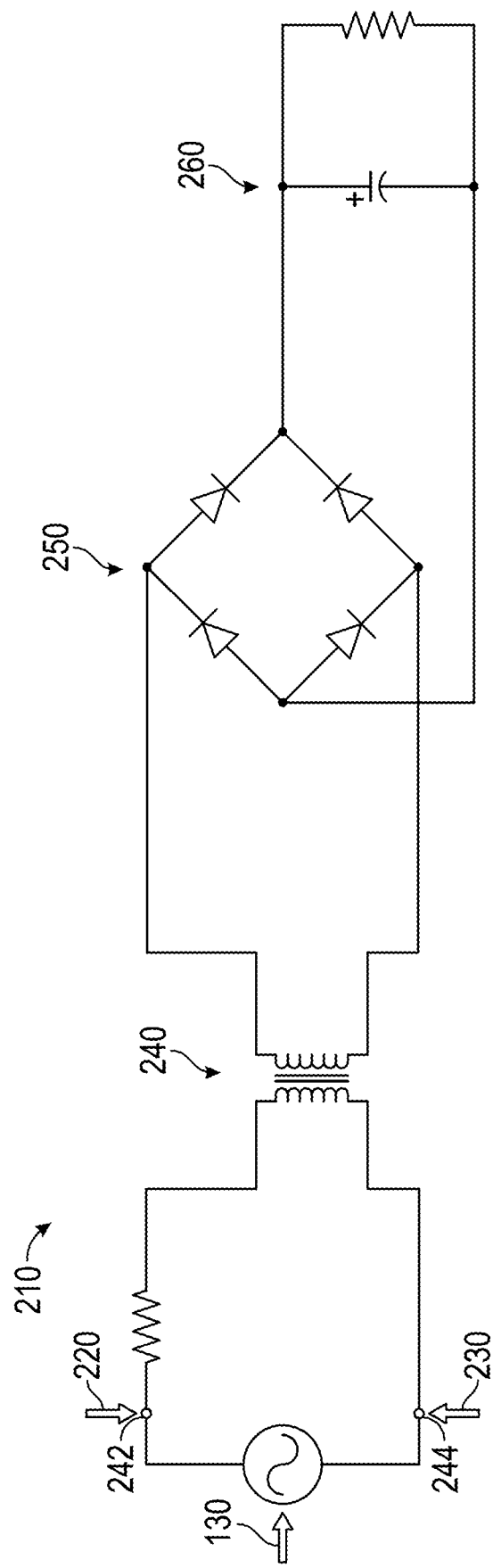
FIG. 8 is an electrical diagram displaying voltage control of energy produced by the coil regeneration device.

With reference to FIG. 8, an electrical diagram displaying voltage control of energy produced by the coil regeneration device 100 will be described. The electrical diagram illustrates the electrical circuit 210. A transformer 240 transforms low voltage-high current to high voltage-low current. The transformer includes input ports 242, 244 (shown by arrows in FIG. 1) that connect to the positive and negative voltages produced at ends 220, 230 (shown by arrows in FIG. 8) of the copper wire members 170, 180. In an alternative embodiment, the input ports 242, 244 may be the opposite of that shown. A rectifier 250 then takes alternating current-voltage and produces direct current-voltage. A capacitor 260 then makes the voltage steady for the load's internal resistance representing energy storage or consumption.

The coil regeneration device 100 is designed to be integratable within a large range of applications, and is intended for energy conversion for storage and consumption. Broad applications that the coil regeneration device 100 may be used for, but is not limited to, include water dams, lake reserves, cliff-side ocean generators, and exercise machines. Any entity that creates kinetic energy or potential kinetic energy, may serve as a suitable application for the coil regeneration device 100. Another more specific application is for electric vehicles and hybrids. This includes, but is not limited to, cars, trucks, bikes, motorcycles, and watercrafts of all types. The coil regeneration device 100 extends the range drivable by an electric vehicle, adding practicality and efficiency, which travels on roads and uses electricity to any extent to power the electric drive units and/or any on-board electronic devices. Mounted to the suspension, the coil regeneration device(s) 100 translates the otherwise lost kinetic energy incurred by a vehicle's physics due to gravity. The potential kinetic energy is harnessed by the vibrations caused from a road's surface when the vehicle is in motion. The electric energy produced by the coil regeneration device 100 is stored in the vehicle's battery, supercapacitors, or other storage types until used by any one of the vehicle's loads. The oscillating motion is forced due to one end of the coil regeneration device 100 being mounted to a moving surface of a part of the suspension and the other end being mounted to a stationary surface of the chassis of the vehicle.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A coil regeneration device, comprising:
    an electrically conductive wire including a coiled section;
    a casing holding the coiled section in place;
    a double magnet system including a free-floating inner magnet having a cylindrically solid shape coaxially disposed inside and movable along a central axis of the coiled section and an outer magnet having a ring shape coaxially surrounding the coiled section and movable along the central axis of the coiled section so that the inner magnet and the outer magnet are coaxially attracted to each so that when the outer magnet moves, the inner magnet is forcibly moved;

an outer casing coupled to the outer magnet, wherein the double magnet system is configured to be coupled to a dynamic foreign entity that applies a specific frequency of oscillating motion that translates into corresponding oscillating motion of the outer magnet, which imparts corresponding oscillating motion to the inner magnet, the oscillating motion of the double magnet system relative to the coiled section producing a magnetic field that induces an electrical field in the electrically conductive coil.

2. The coil regeneration device of claim 1, wherein the double magnet system is configured so that oscillating motion of the outer magnet imparts lagging and corresponding oscillating motion to the inner magnet.

3. The coil regeneration device of claim 1, wherein the casing encloses the coiled section and is not physically coupled to the inner magnet so that the inner magnet is only held by coaxial attraction with the outer magnet.

4. The coil regeneration device of claim 3, wherein the outer casing and the coil casing include ends configured to be mounted to the dynamic foreign entity.

5. The coil regeneration device of claim 1, further including an electrical circuit electrically coupled to the electrically conductive wire to produce electricity.

6. The coil regeneration device of claim 5, wherein the electrical circuit includes a transformer that transforms low voltage-high current to high voltage-low current.

7. The coil regeneration device of claim 6, wherein the electrical circuit includes a rectifier that takes alternating current-voltage and produces direct current-voltage.

8. The coil regeneration device of claim 7, wherein the electrical circuit includes a capacitor that makes the voltage steady.

9. A method of using the coil regeneration device of claim 1, comprising:

receiving from the dynamic foreign entity oscillating motion, which translates into corresponding oscillating motion of the outer magnet;

imparting corresponding oscillating motion to the inner magnet from the corresponding oscillating motion of the outer magnet;

producing a magnetic field that induces an electrical field in the electrically conductive wire caused by the oscillating motion of the double magnet system relative to the coiled section.

10. The method of using the coil regeneration device of claim 9, wherein oscillating motion of the outer magnet imparts lagging and corresponding oscillating motion to the inner magnet.

11. The method of using the coil regeneration device of claim 9, further including an electrical circuit electrically coupled to the electrically conductive wire to produce electric energy, and the method further comprising producing electric energy with the coil regeneration device.

12. The coil regeneration device of claim 1, wherein the inner magnet is only a single inner magnet.

13. The coil regeneration device of claim 12, wherein the outer magnet is only a single outer magnet.

14. The coil regeneration device of claim 1, wherein the inner magnet is a single inner magnet, the outer magnet is a single outer magnet, and the single inner magnet and the single outer magnet have the same height.

15. The coil regeneration device of claim 14, wherein the coiled section has the same height as the single inner magnet and the single outer magnet.

16. The coil regeneration device of claim 1, wherein the inner magnet has a single direction magnetic force and the outer magnet has a single direction magnetic force.

* * * * *